United States Patent [19]

Florant

[11] Patent Number: 5,534,924
[45] Date of Patent: Jul. 9, 1996

[54] METHOD AND DEVICE TO OBTAIN AN ELEMENT OF INFORMATION ON DEPTH IN THE FIELD SEEN BY PICTURE-SHOOTING DEVICE

[75] Inventor: Olivier Florant, Epinay Sur Senart, France

[73] Assignee: Thomson Broadcast, Cergy St Christophe, France

[21] Appl. No.: 165,574

[22] Filed: Dec. 13, 1993

Related U.S. Application Data

[63] Continuation of Ser. No. 842,534, Feb. 27, 1992, abandoned.

[30] Foreign Application Priority Data

Mar. 5, 1991 [FR] France .................................. 91 02604

[51] Int. Cl.⁶ .................................................. H04N 5/238
[52] U.S. Cl. .......................................... 348/364; 348/207
[58] Field of Search ...................................... 348/345, 347, 348/349, 354, 362, 363, 364; 382/103, 106, 173, 199, 263; H04N 7/09

[56] References Cited

U.S. PATENT DOCUMENTS

| | | | |
|---|---|---|---|
| 3,746,782 | 7/1973 | Driskell | 358/183 |
| 4,030,817 | 6/1977 | Westell | 359/888 |
| 4,404,594 | 9/1983 | Hannan | 358/209 |
| 4,798,437 | 1/1989 | Rediker | 385/3 |
| 5,023,724 | 6/1991 | Ferren | 348/354 |
| 5,039,214 | 8/1991 | Nagata et al. | 358/386 |
| 5,132,802 | 7/1992 | Osthues et al. | 358/213.28 |
| 5,157,499 | 10/1992 | Oguma et al. | 358/213.11 |
| 5,365,597 | 11/1994 | Holeua | 348/8 |

FOREIGN PATENT DOCUMENTS

| | | | |
|---|---|---|---|
| 2549327 | 1/1985 | France | H04N 1/387 |
| 2609817 | 1/1987 | France | G03B 3/04 |
| 63224557 | 1/1989 | Japan | H04N 5/225 |
| 1001537 | 8/1965 | United Kingdom . | |
| 1094193 | 12/1967 | United Kingdom | H04N 9/08 |

*Primary Examiner*—Wendy R. Greening
*Assistant Examiner*—Tuan V. Ho
*Attorney, Agent, or Firm*—Oblon, Spivak, McClelland, Maier & Neustadt

[57] ABSTRACT

A method and an apparatus is disclosed for extracting from a single shot, two pictures of an illuminated scene having a foreground zone and a background zone respectively. The first picture has a depth of field which is greater than the second picture. Subsequently the high frequency components are extracted from each of the pictures in order to reflect characteristics of each of the pictures which have the greatest amount of contrast or sharpness. The two high frequency signals are compared in order to obtain a depth of field signal based upon the differences between the two signals.

11 Claims, 4 Drawing Sheets

5,534,924

METHOD AND DEVICE TO OBTAIN AN ELEMENT OF INFORMATION ON DEPTH IN THE FIELD SEEN BY PICTURE-SHOOTING DEVICE

This application is a Continuation of application Ser. No. 07/842,534, filed on Feb. 27, 1992, now abandoned.

BACKGROUND OF THE INVENTION

1. Field of the Invention

The invention relates to a method and a device that can be used to obtain an element of information on depth in a picture-shooting device in order to enable the demarcation, in a picture, of the foreground zones from a background.

The invention can be applied notably to the field of television and cinema.

2. Description of the Prior Art

The television industry very often uses a special effects device enabling the extraction, from a colored background that is as uniformly colored as possible, of picture elements. This extraction can be done only if these picture elements do not contain the colors used in the background. These different devices are called chromakeys.

The limitations arising out of the need to have a uniform background color often make it impossible to achieve certain special effects, and it would be desirable to have information available on depth where such information is capable of establishing a very precise demarcation between the foreground subject and the backgrounds or backdrops, irrespectively of the variety of the colors with which they appear on the picture.

SUMMARY OF THE INVENTION

The present invention can be used to obtain this element of information on depth in the field seen by a picture-shooting device and thus makes it possible to decide whether an element belongs to the foreground or to the background.

According to the invention, the method that can be used to obtain an element of information on depth in the field seen by a picture-shooting device consists in:

extracting, from a shot, two pictures of an illuminated scene comprising foreground zones and background zones, the depth of the field seen by the picture-shooting device being greater for the first picture than for the second picture;

extracting, from each picture, high frequency components characteristic of the sharpness of the pictures, in such a way as to obtain two high frequency signals;

comparing the two high frequency signals to obtain a depth signal by difference.

BRIEF DESCRIPTION OF THE DRAWINGS

Other particular features and advantages of the invention shall appear clearly from the following description, given by way of a non-restrictive example and made with reference to the appended figures, of which.

DESCRIPTION OF THE PREFERRED EMBODIMENTS

Figure 1:
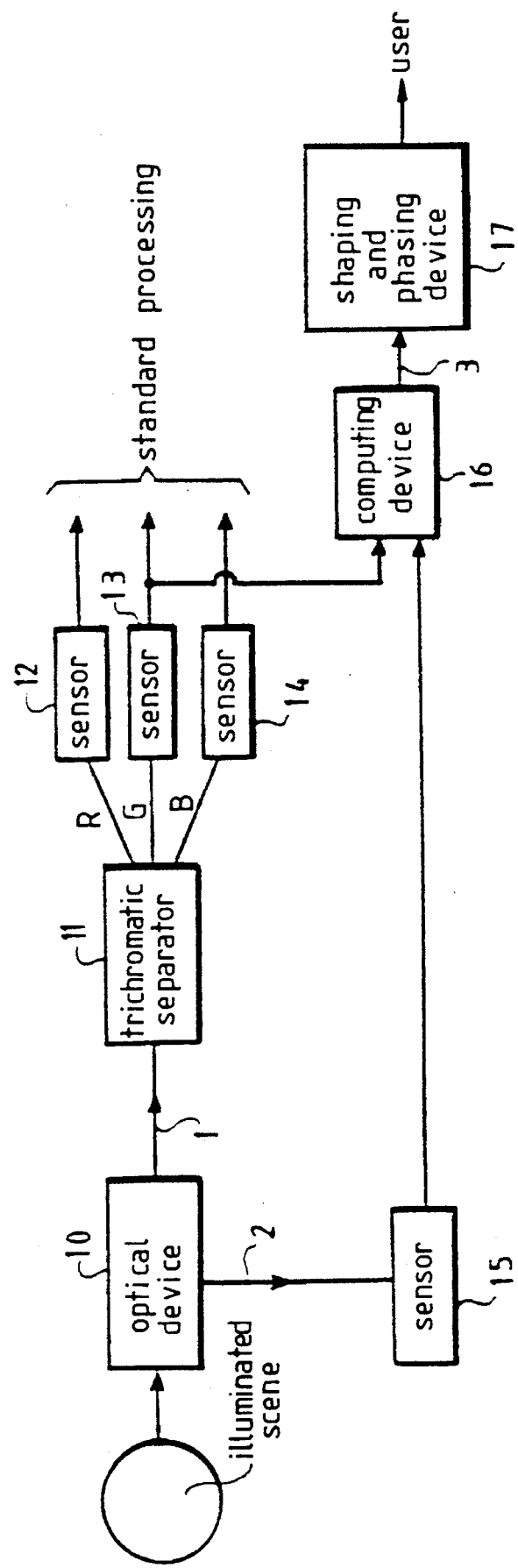
FIG. 1 shows a picture-shooting device that delivers a picture of an illuminated scene and a depth signal, according to the invention.

FIG. 1 shows a picture-shooting device that delivers a picture of an illuminated scene and a depth signal, according to the invention.

The illuminated scene has foreground zones and background zones. The picture-shooting device includes an optical device 10 receiving, at input, light rays reflected by the illuminated scene and delivering two optical signals for one and the same shot at output:

a first optical signal 1, corresponding to a first picture of the illuminated scene, in the visible frequencies range; this first optical signal is obtained with a focusing that is adjusted on the foreground zones and a field depth that is wide enough for the picture to be uniformly sharp;

a second optical signal 2 corresponding to a second picture of the same illuminated scene, in a range of narrow band frequencies $\Delta f$ centered on a frequency fc located equally well in the visible range or in the near infra-red range. This second optical signal is obtained with a focusing identical to that of the first picture but with a field depth that is reduced in relation to the first picture. This second picture therefore comprises sharp foreground zones and blurred background zones.

The optical zone 2 is transmitted directly from the optical device 10 to a sensor 15 that delivers the corresponding electrical signal at output.

The frequency band $\Delta f$ is narrow enough for the blurred nature of the picture to be due solely to the small field depth and not to chromatic aberrations, but it should also have sufficient light energy to enable full use to be made of the sensitivity of the sensor 15.

The scene is illuminated by an illumination device by which the picture sent back by the subjects of the scene can be given sufficient energy for the sensitivity of the sensor 15 used.

The optical signal 1 which constitutes the main signal is transmitted to a trichromatic separator 11 which separates the three spectral components red R, green G, blue B of the visible picture. The outputs R, G, B of the trichromatic separator are respectively connected to three sensors 12, 13, 14 which deliver, at output, on three different channels, the three primary electrical signals corresponding to the three visible colors, red, green and blue, of the visible picture.

Two different processing operations are then carried out in parallel, firstly in order to reconstitute the picture of the illuminated scene and, secondly, in order to obtain a depth signal.

The picture of the illuminated scene is obtained by a standard processing of the three primary electrical signals delivered by the sensors 12, 13 and 14.

The depth signal is obtained by the use, firstly, of one or more primary electrical signals and, secondly, of the electrical signal coming from the sensor 15.

In FIG. 1, only one primary electrical signal is used. This is the output signal of the sensor 13 corresponding to the color green. It is naturally possible to use the color red or the color blue. The output signals from the sensors 13 and 15 are transmitted to a computation device 16 which delivers a depth signal 3 at output. This depth signal is then transmitted before use to a shaping and phasing device 17. The computation of a depth signal can be done for each primary color if this proves to be necessary.

Figure 2:
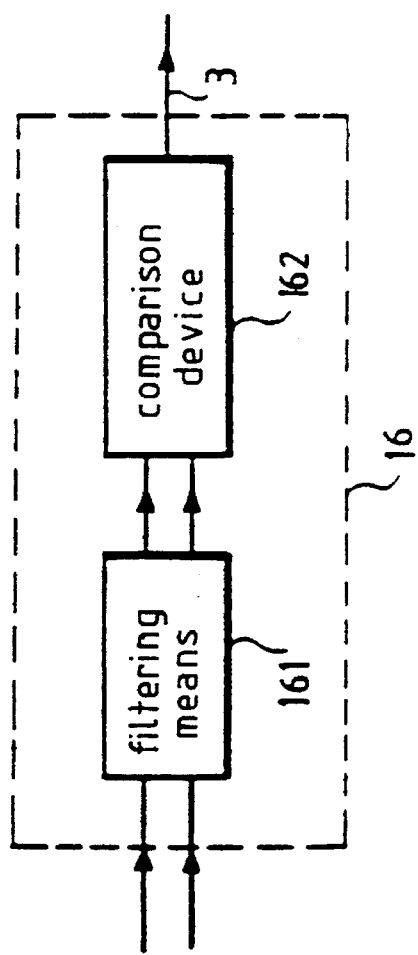
FIG. 2 shows a first exemplary embodiment of a device to compute the depth signal.

FIG. 2 shows a first exemplary embodiment of the device for computing the depth signal.

In this computing device 16, the output signal from the sensor 15 and the output signal from one of the sensors 12, 13, 14 are processed analogically as follows.

They are first of all transmitted to filtering means 161 so as to extract the high frequencies therefrom, then the two high frequency signals are compared with each other in a comparison device 162 which delivers, at output, a depth signal 3 equal to the difference between the two high frequency signals. This depth signal 3 corresponds to the zones where the high frequencies are substantially absent from the picture with low field depth as compared with the visible picture. This depth signal is used to determine whether a picture element belongs to foreground zones with respect to background zones or with respect to a backdrop, for the high frequencies are present only when there are steep transitions in the picture, hence when the picture is sharp.

Figure 3:
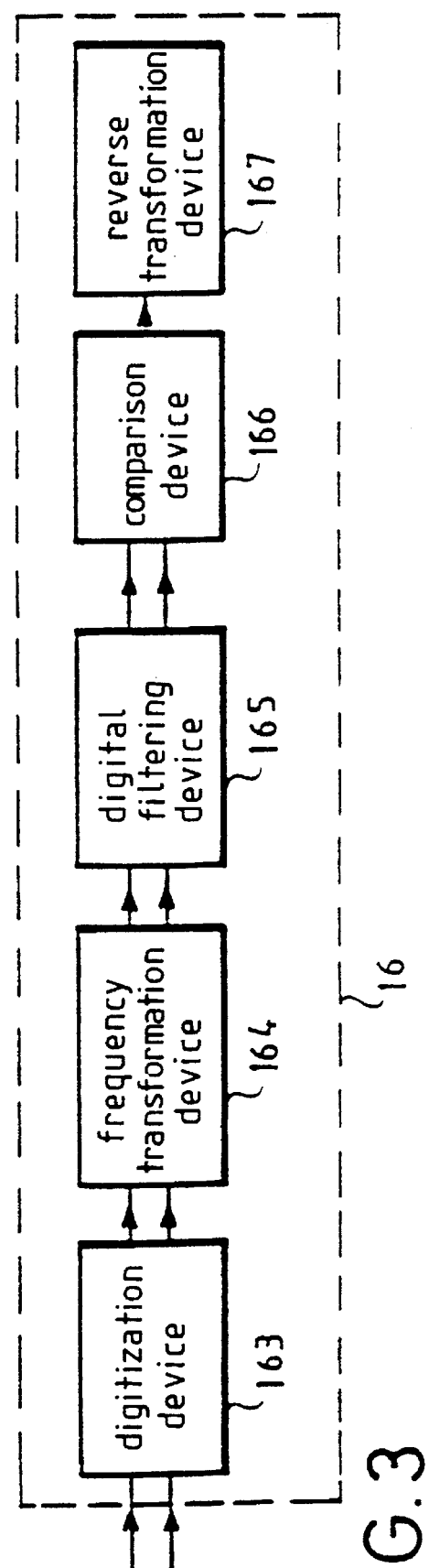
FIG. 3 shows a second exemplary embodiment of a device to compute the depth signal.

FIG. 3 shows a second exemplary embodiment of the device for computing the depth signal.

In this computing device 16, the output signal from the sensor 15 and the output signal from one of the sensors 12, 13, 14 are processed digitally as follows:

These signals are first of all digitized according to the same sampling characteristics in a digitization device 163, then processed in real time after having given them a frequential representation in the frequency transformation device 164 in using, for example, a fast Fourier transform or a discrete cosine transform or a wavelet transform etc.

The real-time processing of the digital signals thus obtained consists in a digital filtering, carried out by a digital filtering device 165, of each of the signals to extract the high frequencies therefrom, followed by a comparison of two high frequency signals in a comparison device 166, to obtain a depth signal. This signal is then put back into the spatial domain by the reverse transformation device 167 which carries out the transform that is the reverse of the one carried out by the frequency transformation device 164.

Figure 4:
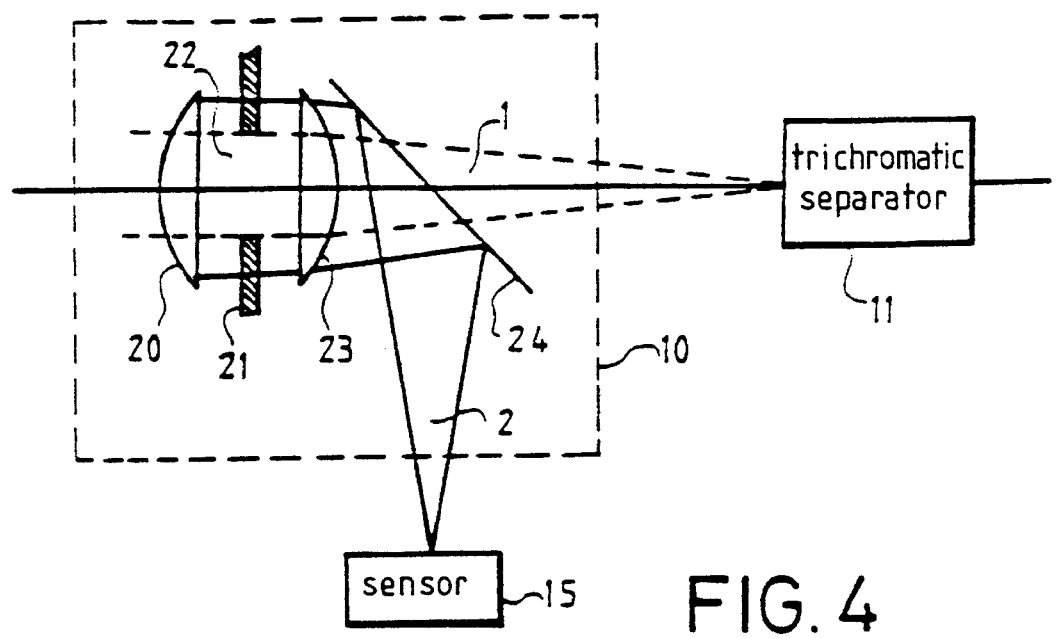
FIG. 4 shows a first embodiment of an optical device according to the invention.

FIG. 4 shows a first embodiment of the optical device according to the invention.

According to a first embodiment of the invention, the optical device 10 has an input objective 20, followed by a diaphragm 21 comprising a zone transparent to all the frequencies and a zone selectively letting through optical frequencies belonging to a narrow frequency band $\Delta f$ centered on a central frequency fc. This diaphragm 21 is, for example, an annular dichroic filter comprising a central zone, called a pupil 22, transparent to all the optical frequencies, and an annular zone opaque to all the frequencies that do not belong to the frequency band $\Delta f$ centered on the frequency fc. The relative dimensions of the opaque and transparent zones may be either fixed or adjustable. The adjusting may be done, for example, by means of a filter-bearing wheel on which the dichroic filter is positioned. The adjusting may also be obtained for example by using an iris, the shutters of which are dichroic filtering elements.

The adjusting of the pupil 22 of the diaphragm 21 makes it possible to vary the depth of the field of the picture-shooting device. To have a great field depth and, consequently, a uniformly sharp picture, it is necessary to close the pupil.

The diaphragm 21 is followed by an eyepiece 23 focusing the light rays. At output of the eyepiece 23, there is positioned a mirror 24. This mirror selectively reflects the optical frequencies belonging to the frequency band $\Delta f$ centered on the optical frequency fc and lets through all the other optical frequencies. The optical frequencies reflected by the mirror constitute the optical signal 2 which is transmitted to the sensor 15. The other optical frequencies constitute the optical signal 1 and are transmitted to the trichromatic separator 11.

Figure 5:
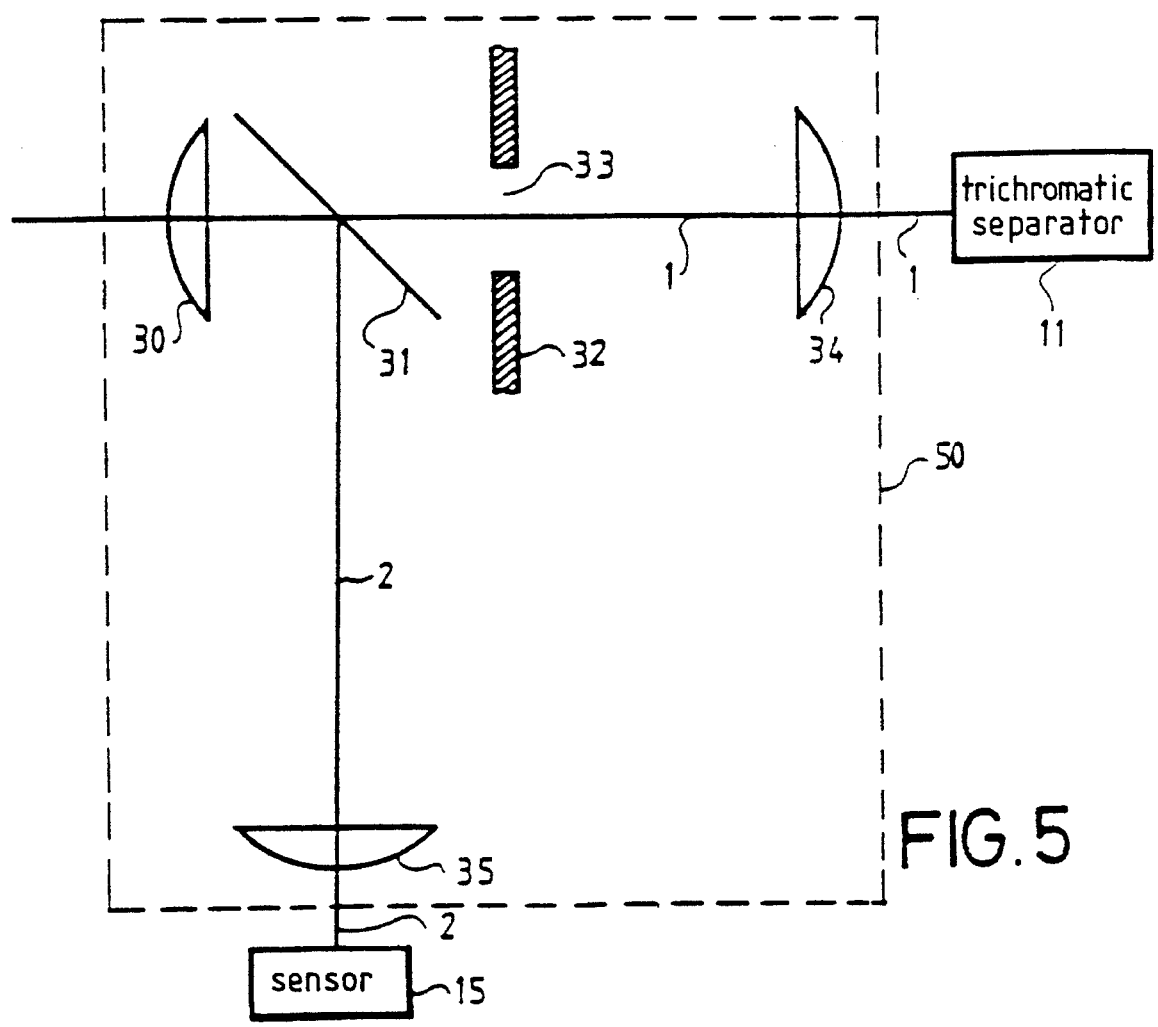
FIG. 5 shows a second embodiment of an optical device according to the invention.

FIG. 5 shows a second embodiment of the optical device according to the invention. According to this second embodiment, the optical device 50 has an input objective 30 followed by a selective mirror 31 reflecting the optical frequencies belonging to the frequency band $\Delta f$ centered on the optical frequency fc and letting through all the other optical frequencies. This selective mirror 31 therefore separates the path of the light rays into two different paths. On the path of the rays transmitted by the selective mirror 31, referenced path 1, there is interposed a diaphragm 32 comprising an adjustable aperture called a pupil 33. The adjustment of the pupil 33 makes it possible to vary the field depth of the picture-shooting device.

The light rays that have gone through the diaphragm are then transmitted to an eyepiece 34 which focuses them. These light rays emerging from the eyepiece 34 constitute the optical signal 1 which is transmitted to the trichromatic separator 11.

The light rays reflected by the selective mirror 31 are directly transmitted to an eyepiece 35 which focuses them. These light rays, emerging from the eyepiece 35, then constitute the optical signal 2 which is transmitted to the sensor 15.

The optical devices 10, 50 described hereabove with reference to FIGS. 4 and 5 make it possible, in a single shot, to obtain two pictures of an illuminated scene along two different optical paths 1, 2. The path 1 is the main path and the path 2 is a deflected path. These two optical paths correspond to two optical beams which are obtained, from an incident optical beam coming from the illuminated scene, in selectively deflecting the optical frequencies belonging to the frequency band $\Delta f$ centered on the frequency fc. The two pictures are shot with the same setting of the focusing, this setting being done on the foreground zones, but with a different field depth setting. This difference in field depth is obtained by achieving a difference is optical aperture between the two optical beams by means of a diaphragm 21, 22 interposed on the optical path 1, the aperture 22, 33 of this diaphragm (called a pupil) being adjusted so as to obtain a greater field depth on the optical path 1 than on the optical path 2. In this way, the picture along the path 1 is uniformly sharp and the picture along the path 2 has sharp foreground zones and blurred background zones.

In a device such as this, it is essential that the focusing on the foreground zones should be precisely adjusted. In order to avoid possible errors in the focusing of the picture-shooting device, an ancillary telemetrical measuring device 37 may be positioned in the optical device.

Figure 6:
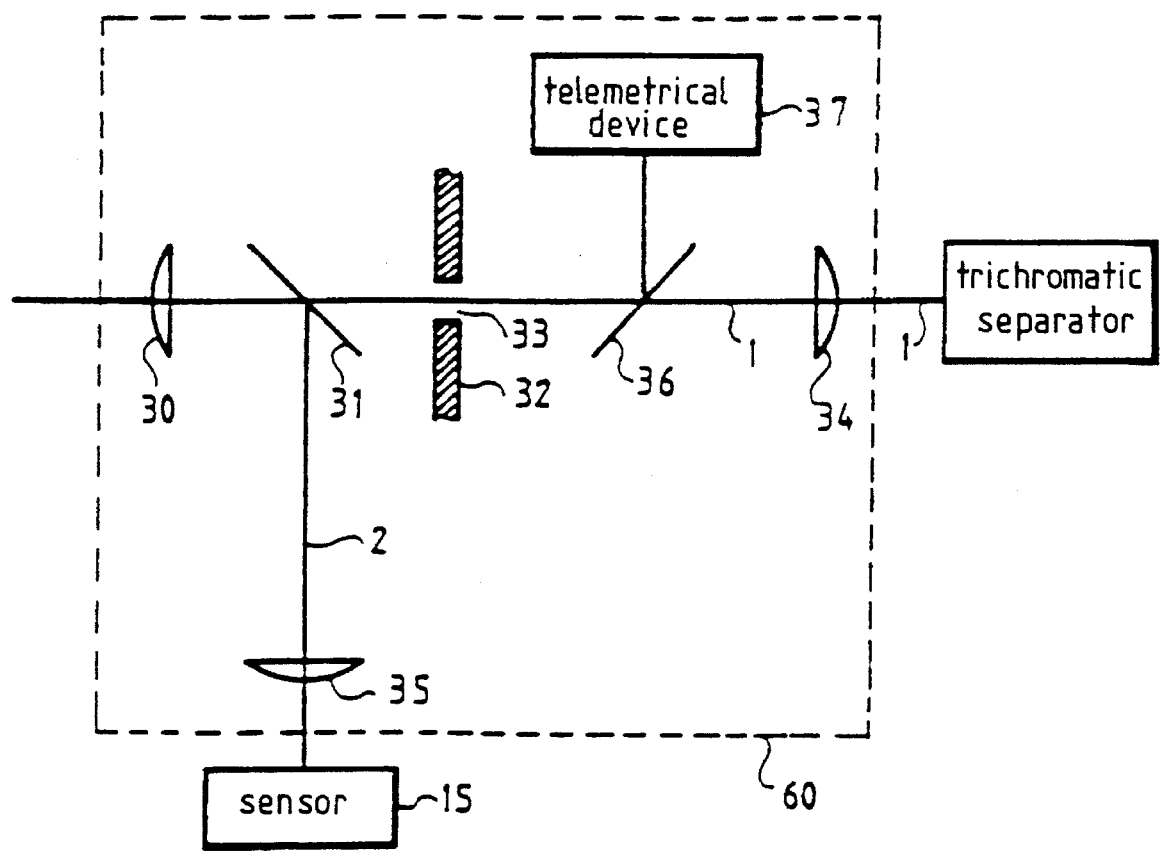
FIG. 6 shows an example of an optical device comprising a telemetrical measuring device, according to the invention.

FIG. 6 shows an example of an optical device comprising a telemetrical measuring device. According to FIG. 6, the optical device 60 has, on the optical path 1 which corresponds to the picture of the illuminated scene proper, a device, for example a prism 36, which intercepts a part of the optical signal 1 and transmits it to the telemetrical measuring device 37. This telemetrical measuring device then delivers a information element on the distance of the main subject in the foreground zone to be preserved in the picture, and does the focusing in a precise way.

The central frequency of the reflected signal may be chosen in the visible range as well as in the near infra-red range, but preference may be given to the near infra-red range, generally eliminated by filtering in the usual cameras, so as not to lose a part of the information of the picture of the scene in the visible range.

What is claimed is:

1. A device for obtaining a signal providing an indication of differentiation between foreground areas and background areas in images of a scene, comprising:

an optical device designed to receive, at input, light rays coming from the illuminated scene and to deliver, at output, first optical rays in the visible frequencies range and second optical rays in the frequency band $\Delta f$ centered on a first frequency fc, a trichromatic separator designed to separate the three spectral components, red, green and blue, of the first optical rays to constitute three primary rays, four sensors designed to receive respectively the three primary rays corresponding to the three spectral components and the optical signal of the frequency band $\Delta f$ and to deliver, at output, four corresponding electrical signals, a device to compute said differentiation signal designed to receive, at input, the electrical signal corresponding to at least one of the primary rays and the electrical signal corresponding to the optical ray of the frequency band $\Delta f$, a device for the shaping and phasing of said differentiation signal.

2. A device according to claim 1, wherein the optical device includes means enabling the selective deflection of the optical frequencies belonging to the frequency band $\Delta f$ centered on the optical frequency fc in such a way as to obtain two optical beams and means making it possible to vary the optical aperture between the two optical beams thus obtained.

3. A device according to claim 2, wherein the optical device includes a telemetrical measuring device that can be used to adjust the focusing with precision.

4. A method for obtaining information to differentiate between foreground areas and background areas in images of a scene, comprising the steps of:

providing first and second images of said scene from an image-generating device, said first image being generated with a first given aperture of the optical system of said image-generating device, said second image being generated with a second aperture larger than said first given aperture, extracting, from each image, high frequency components corresponding to steep transitions, characteristic of the sharpness of the images, in such a way as to obtain two signals indicative of the high frequency components, comparing said two signals indicative of the high frequency components to obtain a signal which provides an indication of differentiation between said foreground areas and said background areas.

5. A method according to claim 4, wherein the frequency range of the first image is that of the visible frequencies and the frequency range of the second image is a frequency band $\Delta f$ centered on a determined frequency fc.

6. A method according to claim 5, wherein the two images are obtained from an incident optical beam coming from the illuminated scene, by the selective deflecting of the optical frequencies belonging to the frequency band $\Delta f$ centered on the frequency fc so as to obtain two optical beams, and by the establishing a difference in optical aperture between the two optical beams thus obtained.

7. A method according to claim 5, wherein the central frequency fc is located in the visible frequencies range.

8. A method according to claim 5, wherein the central frequency fc is located in the infra-red range.

9. A method according to claim 5, wherein the frequency band $\Delta f$ is narrow enough to avoid problems of chromatic aberrations.

10. A method according to claim 4, wherein the signal providing said indication of differentiation between said foreground areas and said background areas is equal to the difference between the two high frequency signals.

11. A method according to claim 4, also comprising the step, prior to providing said two images, of adjusting the focussing of the image generating device on the foreground of said scene.

* * * * *